US006681242B1

(12) United States Patent
Kumar et al.

(10) Patent No.: US 6,681,242 B1
(45) Date of Patent: Jan. 20, 2004

(54) METHOD AND APPARATUS FOR DETECTING DEPENDENCY CYCLES BETWEEN RESOURCES IN A COMPUTER SYSTEM

(75) Inventors: Naveen Kumar, Newark, CA (US); Andrew L. Hisgen, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/480,149

(22) Filed: Jan. 10, 2000

(51) Int. Cl.$^7$ .......................... G06F 9/00; G06F 15/173
(52) U.S. Cl. ................ 709/104; 709/100; 709/102; 709/223; 709/226
(58) Field of Search ................... 710/200; 709/100, 709/104, 107, 226, 223

(56) References Cited

U.S. PATENT DOCUMENTS

| | | | | | |
|---|---|---|---|---|---|
| 5,440,743 | A | * | 8/1995 | Yokota et al. | 710/200 |
| 5,845,117 | A | * | 12/1998 | Fujita | 709/104 |
| 6,188,995 | B1 | * | 2/2001 | Garst et al. | 380/201 |
| 6,236,995 | B1 | * | 5/2001 | Cummins | 707/8 |
| 6,292,910 | B1 | * | 9/2001 | Cummins | 714/43 |
| 6,304,938 | B1 | * | 10/2001 | Srivastava | 710/200 |

OTHER PUBLICATIONS

IBM Technical Disclosure Bulletin, "Deadlock Free Resource Allocation in Networks", May, 1972, vol. 14, iss. 12, pp. 3660–3663.*

IBM Technical Disclosure Bulletin, "Deadlock Detection for all Resource classes", Apr., 1980, vol. 22 No. 11, pp. 5078–5079.*

* cited by examiner

*Primary Examiner*—David Wiley
*Assistant Examiner*—Joseph E. Avellino
(74) *Attorney, Agent, or Firm*—Park, Vaughan & Fleming LLP (57) ABSTRACT

One embodiment of the present invention provides a system that detects cycles in a set of dependencies between a set of resources in a computer system. The system operates by receiving a new dependency indicating that a first resource cannot proceed unless a second resource is able to proceed. The system determines if the new dependency creates a cycle in the set of dependencies by performing a search, which looks for cycles of dependencies starting from the first resource and ending at the first resource. If the search detects such a cycle, the system indicates that the new dependency creates the cycle. The system may also send an error message when the cycle is detected, and may abort further processing. In one embodiment of the present invention, the new dependency between the first resource and the second resource indicates that the second resource must be started before the first resource is started. In one embodiment of the present invention, the new dependency between the first resource and the second resource indicates that the first resource must be stopped before the second resource is stopped.

21 Claims, 5 Drawing Sheets

| ITERATION | TO_VISIT RESOURCE LIST | VISITED RESOURCES |
|---|---|---|
| 1 | A | - |
| 2 | B | A |
| 3 | C | A,B |
| 4 | D,A | A,B,C |

| ITERATION | TO_VISIT RESOURCE LIST | VISITED RESOURCES |
|---|---|---|
| 1 | A | - |
| 2 | B | A |
| 3 | - | A,B |

METHOD AND APPARATUS FOR DETECTING DEPENDENCY CYCLES BETWEEN RESOURCES IN A COMPUTER SYSTEM

BACKGROUND

1. Field of the Invention

The present invention relates to operating systems for computers. More specifically, the present invention relates to a method and an apparatus for rapidly detecting cycles in a set of dependencies between resources in a computer system.

2. Related Art

Computer systems often support large numbers of resources that work together in performing computational tasks. This is particularly true for distributed computing systems in which numerous resources are distributed across multiple computing nodes.

Resources often depend on other resources, which can complicate the task of coordinating the resources so that they can work together. For example, an enterprise computing application may depend on an underlying database application in order to operate. Hence, if the underlying database application is unable to operate, the enterprise computing application is unable to operate.

Note that dependencies can be chained together. For example, the underlying database application may itself depend on storage system in order to operate. Hence, if the storage system is unable to operate, the underlying database application is unable to operate and the enterprise computing system application is unable to operate.

A deadlock condition can occur if a cycle of dependencies exists between applications in the computer system. For example, if the above-described storage system requires parameters from the enterprise computing application in order to operate, a cycle of dependencies exists between the storage system, the underlying database application and the enterprise computing application. Hence, a deadlock condition exists and none of the resources is able to operate.

Deadlock can be avoided (or at least diagnosed) by running a cycle detection algorithm on dependencies between resources in the computer system. A cycle detection algorithm typically operates on a directed graph in which resources are represented by nodes and dependencies are represented as directed edges (arcs) between the nodes.

Unfortunately, the process of detecting cycles can be very time-consuming in systems containing large numbers of resources and large numbers of dependencies. Hence, the cycle detection process can cause significant delays.

What is needed is a method and an apparatus that rapidly detects cycles of dependencies between resources in a computer system without incurring a large amount of computational overhead.

SUMMARY

One embodiment of the present invention provides a system that detects cycles in a set of dependencies between a set of resources in a computer system. The system operates by receiving a new dependency indicating that a first resource cannot proceed unless a second resource is able to proceed. The system determines if the new dependency creates a cycle in the set of dependencies by performing a search, which looks for cycles of dependencies starting from the first resource and ending at the first resource. If the search detects such a cycle, the system indicates that the new dependency creates the cycle. The system may also send an error message when the cycle is detected, and may abort further processing.

In a variation on this embodiment, performing the search involves initializing a list to include the first resource. The system then cycles through all resources in the list. It sets a current resource to be the head of the list, and then marks the current resource as "visited." Next, the system examines each resource that the current resource depends on. If the resource is the first resource, the system indicates that a cycle is created. Otherwise, if the resource is not already in the list or has not been marked as visited, the system adds the resource to the list. At some time during this process, the system also removes the current resource from the list.

In one embodiment of the present invention, the computer system is a distributed computing system, and the resources are distributed across computing nodes in the distributed computing system.

In one embodiment of the present invention, the set of resources can include applications, devices and processes within the computer system.

In one embodiment of the present invention, the method is performed by a resource manager that starts and stops resources in the computer system.

In one embodiment of the present invention, the set of resources is divided into a plurality of resource groups, wherein each resource group includes a plurality of related resources.

In one embodiment of the present invention, performing the search includes looking for cycles of dependencies between resources within each resource group and looking for cycles of dependencies between resource groups.

In one embodiment of the present invention, the new dependency between the first resource and the second resource indicates that the second resource must be started before the first resource is started.

In one embodiment of the present invention, the new dependency between the first resource and the second resource indicates that the first resource must be stopped before the second resource is stopped.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
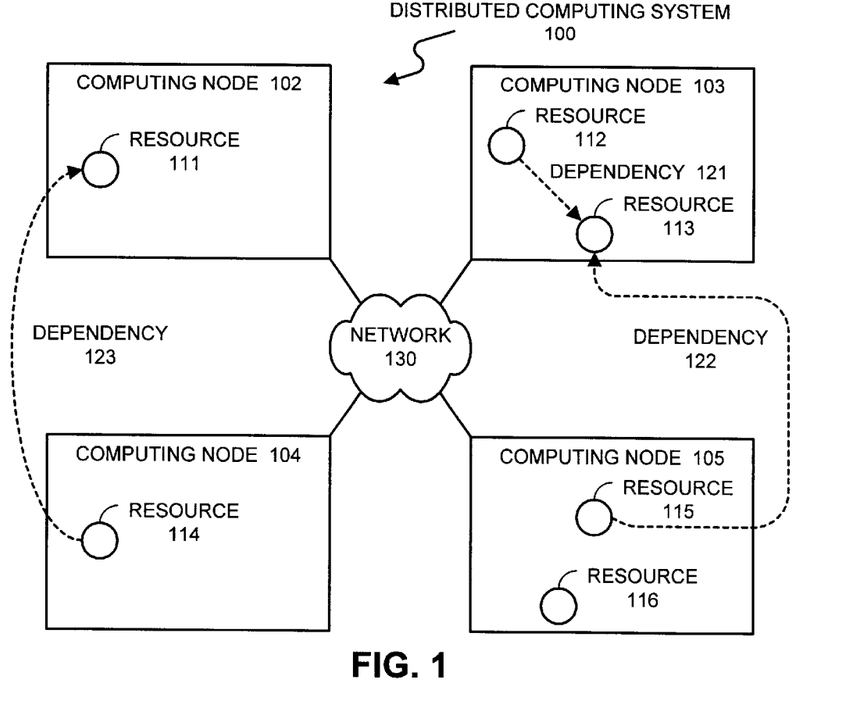
FIG. 1 illustrates a distributed computing system in accordance with an embodiment of the present invention.

FIG. 1 illustrates a distributed computing system 100 in accordance with an embodiment of the present invention. Distributed computing system 100 includes four computing nodes 102–105, which are coupled together through network 130.

Computing nodes 102–105 can include any type of node with computing power, including a computing node based on a microprocessor, a mainframe computer, a digital signal processor, a personal organizer, a device controller, and a computational engine within an appliance.

Network 130 can include any type of wire or wireless communication channel capable of coupling together computing nodes 102–105. This includes, but is not limited to, a local area network, a wide area network, or a combination of networks. In one embodiment of the present invention, network 130 includes the Internet.

Computing nodes 102–105 contain a number of resources 111–116. More specifically computing node 102 includes resource 111, computing node 103 includes resources 112–113, computing node 104 includes resource 114 and computing node 105 includes resources 115 and 116. Resources 111–116 can include any type of entity within distributed computing system 100 that can depend on another entity within distributed computing system 100. This includes, but is not limited to application programs, physical devices, device drivers, processes and operating system components.

There exist a number of dependencies 121–123 between resources 111–116. In particular, dependency 121 indicates that resource 112 within computing node 103 depends on resource 113 (which is also within computing node 103). Dependency 122 indicates that resource 115 within computing node 105 depends on resource 113 within computing node 103. Dependency 123 indicates that resource 114 within computing node 104 depends on resource 111 within computing node 102. In general, a dependency from a first resource to a second resource indicates that the first resource requires some action from the second resource in order to perform some function. For example, an enterprise computing application may depend upon an underlying database application in order to operate. (Also note that it is theoretically possible for a resource to depend on itself, although this degenerate case is typically not allowed and hence causes the system to indicate an error condition.)

In one embodiment of the present invention, resources 111–116 are application programs, and dependencies 121–123 specify constraints on the order in which resources 111–116 can be started. For example, the fact that resource 114 depends upon resource 111 may indicate that during system initialization resource 111 must be started before resource 114. It may also indicate that during system shutdown resource 114 must be stopped before resource 111 is stopped.

In one embodiment of the present invention, resources 111–116 are divided into a number of "resource groups." In this embodiment, resources can only depend upon other resources in the same resource group. In a variation on this embodiment, resource groups can depend upon each other. If this is the case, the system additionally looks for dependency cycles between resource groups.

Note that although the present invention is described in the context of a distributed computing system 100, the invention can generally be applied to any computing system for which there can exist dependencies between resources, including non-distributed uniprocessor and multiprocessor computer systems. Hence, these resources and dependencies can be distributed across any number of nodes, including just one node.

Computing Node

Figure 2:
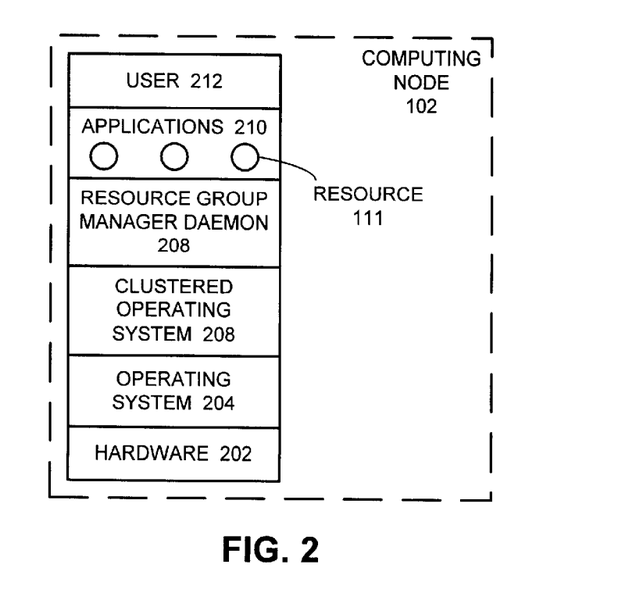
FIG. 2 illustrates software layers within a computing node in accordance with an embodiment of the present invention.

FIG. 2 illustrates software layers within computing node 102 from FIG. 1 in accordance with an embodiment of the present invention. The bottom layer is the hardware 202 upon which the other layers operate. Hardware 202 can include a processor and a memory as well as other computer system components, such as a network interface controller (NIC) or a display.

Operating system 204 resides on top of hardware 202. In general, operating system 204 can include any software that controls the execution of program code on hardware 202.

Clustered operating system 206 resides on top of operating system 204. Clustered operating system 206 coordinates the actions of computing nodes 102–105, and thereby allows computing nodes 102–105 to work together in accomplishing a computational task.

In one embodiment of the present invention, resource group manager daemon (RGMD) 208 resides on top of clustered operating system 206. RGMD 208 generally performs functions related to managing groups of resources for distributed computing system 100. In particular, RGMD 208 can facilitate creation of resources and resource groups. RGMD 208 can also coordinate the starting and stopping of resources 111–116. (Note that dependencies 121–123 may specify constraints on the order in which resources 111–116 are started and stopped). RGMD 208 can additionally move resources 111–116 between computing nodes 102–105.

Applications 210 reside on top of RGMD 208. Note that applications 210 includes resource 111.

Finally user 212 interacts with applications 210. Note that user 212 can include a human user, or alternatively a program for controlling operation of applications 210.

Process of Detecting a Cycle of Dependencies

Figure 3:
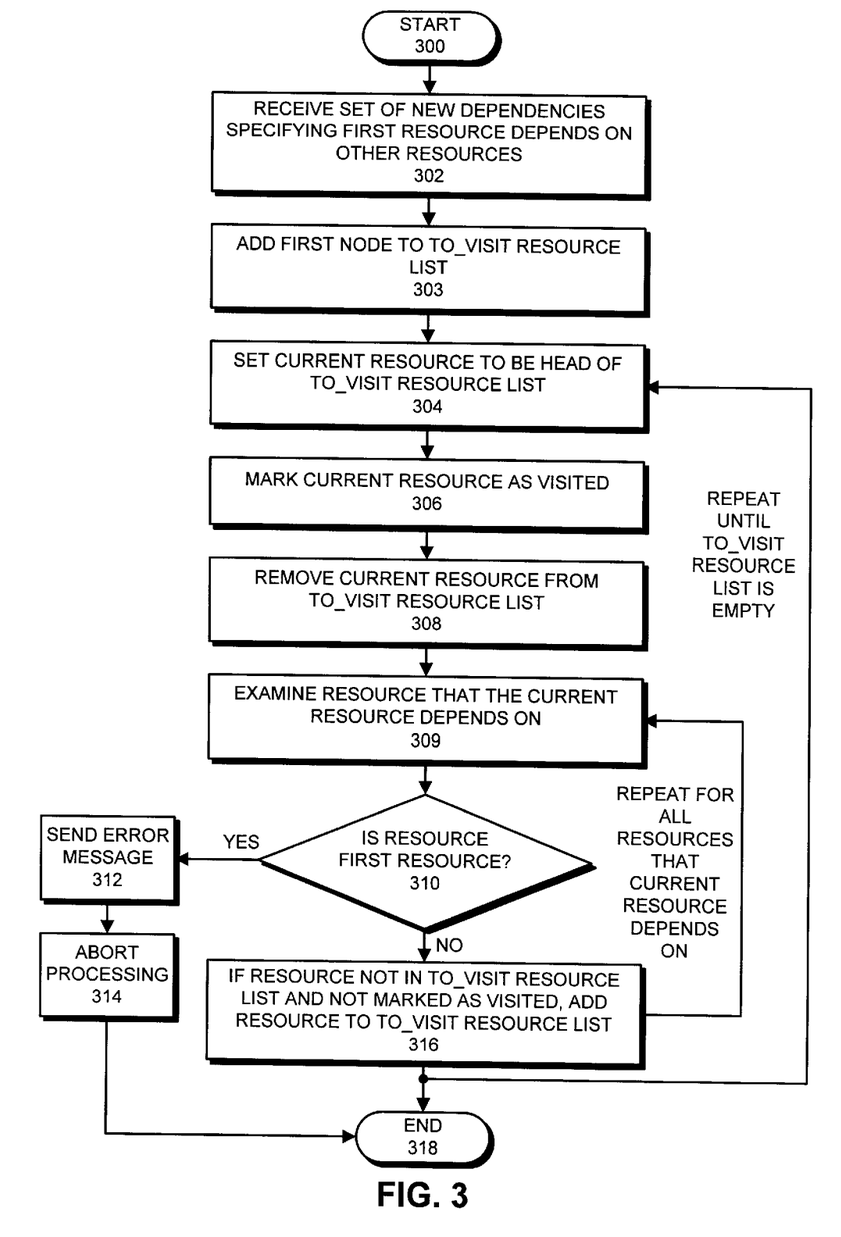
FIG. 3 is a flow chart illustrating the process of determining if a new dependency creates a cycle in accordance with an embodiment of the present invention.

FIG. 3 is a flow chart illustrating the process of determining if a set of new dependencies associated with a first resource creates a cycle of dependencies in accordance with an embodiment of the present invention. (Note that this process may be performed by a pre-appointed computing node from computing nodes 102–105.)

The system starts by receiving a set of new dependencies specifying that the first resource depends on other resources (step 302). Next, the system looks for cycles starting at the first resource and ending at the first resource. Note that if there are no pre-existing dependency cycles, any cycle that is created by the set of new dependencies must include the first resource. Hence, it is only necessary to look for cycles that start and end on the first resource. This greatly reduces the work involved in detecting dependency cycles.

The system looks for a cycle that starts on the first resource and ends on the first resource by placing the first resource on a to_visit resource list (step 303). Next, the system sets a current resource to be the head of the to_visit resource list (step 304). The system then marks the current resource as "visited" (step 306), and then removes the current resource from the to_visit resource list (step 308).

Next, the system enters a loop in which it examines all resources that the current resource depends on. The first step in the loop is to examine a resource that the current resource depends on (step 309). The system determines if this resource is the first resource (step 310). If so a cycle exists, and the system sends an error message to a system user (step 312) and aborts any processing that involves resources in the cycle (step 314).

Otherwise, no cycle has been detected yet. In this case, the system adds the resource to the to_visit resource list if the resource is not already in the to_visit resource list and if the resource is not marked as "visited" (step 316). The system then returns to step 309 to examine the next resource that the current resource depends on (if more of such resources exist). Otherwise the system returns to step 304 to examine the next resource in the to_visit resource list.

Table 1 provides an example section of pseudo-code that performs the operations illustrated in FIG. 3. (Note that this example section of pseudo-code is merely presented as an example and is not intended to limit the scope of the present invention in any way.) In this example section of pseudo-code, resources are represented by nodes, and dependencies between resources are represented as directed edges (arcs) between nodes. The set of nodes and directed edges comprise a graph, G.

This pseudo-code introduces the concepts of nodes being "seen" and nodes being "visited." When the code first looks at a node in the graph, it marks that node as "seen" (this is achieved by adding it to the to_visit_nodes list). Subsequently, when that node is taken out of the to_visit_nodes list, the node is marked as "visited" (by adding it to the visited_nodes list).

The code starts out from the node being updated, say N, and marks it as "seen". Next, the code loops through all the "seen" nodes until the list is empty. The code takes out the first "seen" node, say u, and marks it as "visited". The code then loops through all the nodes reachable from the node u.

TABLE 1

```
detect_cycles(graph G, node N)
{
    // detect cycles in graph G, in which the edges starting at
    // node N are being updated and could potentially create a
    // cycle.
    // the list of nodes that are yet to be visited
    nodelist to_visit_nodes;
    // the list of nodes that have been visited
    nodelist visited_nodes;
    // initialize the to_visit_nodes list with the node being
    // updated, i.e. mark node N as "seen".
    to_visit_nodes = N;
    // loop through the to_visit_nodes list until it's empty
    while (to_visit_nodes != NULL) {
        // fetch the node at head of to_visit_nodes list
        current_node = head(to_visit_nodes);
        // add that node to the visited nodes list, i.e.
        // mark that node as "visited"
        visited_nodes.add_node(current_node);
        // delete that node from the to_visited_nodes list
        to_visit_nodes.delete_node(current_node);
        // Loop through all the nodes, v, reachable from the
        // current_node
        for (each node v reachable from current_node) {
            // if v == N, the node being updated,
            // then we found a cycle in the graph, and hence
            // abort further processing.
            if (v == N) {
                declare "the new edges create a cycle";
                break;
            }
            // If the node v is not already in either of
            // visited_nodes or to_visit_nodes list, add it
            // to the to_visit_nodes list.
            // i.e. if the node v hasn't already been
            // "visited" (not in the visited_nodes list)
            // and hasn't been "seen" (not in the
            // to_visit_nodes list) then mark it as "seen"
            if (!v (- visited nodes) &&
                !v (- to_visit_nodes) {
                add(to_visit_nodes, v);
            }
        }
    }
}
```

For each node, say v, reachable from u, the code checks to see if that node is the node N itself. If v is the same as N then we were able to get back to N by following the outward edges from N, and, hence, we found a cycle in the graph.

In this case, the code aborts further processing and simply exits after printing a suitable error message. If v is not the same as N, the code checks to see if v is either "seen" or "visited." In either case, the code does nothing. If, however, v is neither "seen" nor "visited," the code marks it as "seen."

Example Set of Dependencies

Figure 4A:
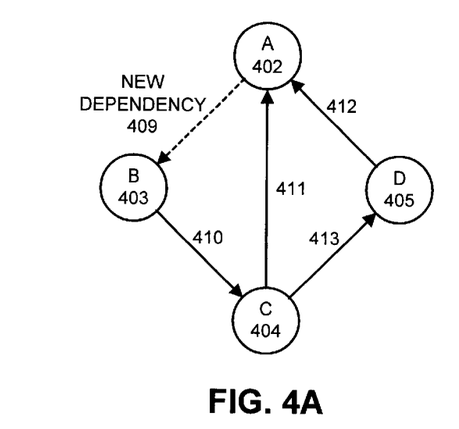
FIG. 4A illustrates an example set of dependencies in accordance with an embodiment of the present invention.

FIG. 4A illustrates an example set of dependencies in accordance with an embodiment of the present invention. In this example, there are four resources 402–405 and four pre-existing dependencies 410–413. New dependency 409 is being added.

Figure 4B:
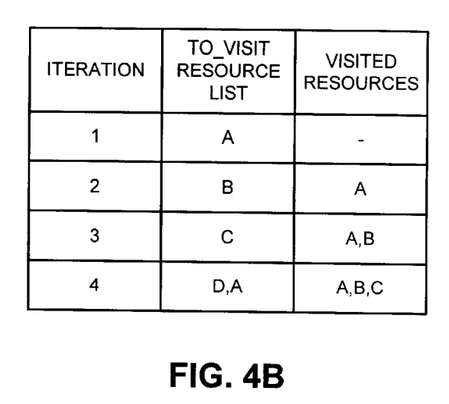
FIG. 4B illustrates the process of determining if a new dependency creates a cycle in the example set of dependencies illustrated in FIG. 4A in accordance with an embodiment of the present invention.

FIG. 4B illustrates the process of determining if new dependency 409 creates a cycle in the example set of dependencies illustrated in FIG. 4A in accordance with an embodiment of the present invention.

During a first iteration, the system adds resource A 402 to the to_visit resource list.

During a second iteration, the system determines that resource A 402 depends on resource B 403 through new dependency 409. Hence, resource B 403 is added to the to_visit resource list, and resource A 402 is removed from the to_visit resource list and marked as visited.

During a third iteration, the system determines that resource B 403 depends on resource C 404 through dependency 410. Hence, resource C 404 is added to the to_visit resource list, and resource B 403 is removed from the to_visit resource list and marked as visited.

During a fourth iteration, the system determines that resource C 404 depends on resource D 405 through dependency 413, and on resource A 402 through dependency 411. Hence, resource D 405 and resource A 402 are added to the to_visit resource list, and resource C 404 is removed from the to_visit resource list and marked as visited. At this point, the system determines that resource A 402 matches the starting resource. Hence there exists a dependency cycle that is created by new dependency 409. The system signals an error condition and aborts further processing.

Another Example Set of Dependencies

Figure 5A:
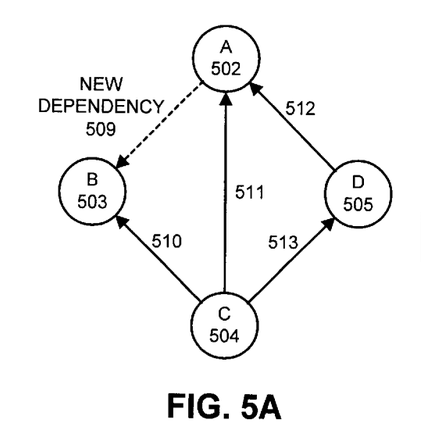
FIG. 5A illustrates another example set of dependencies in accordance with an embodiment of the present invention.

FIG. 5A illustrates another example set of dependencies in accordance with an embodiment of the present invention. In this example, there are four resources 502–505 and four pre-existing dependencies 510–513. New dependency 509 is being added.

Figure 5B:
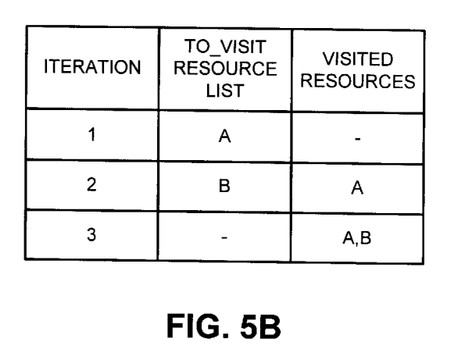
FIG. 5B illustrates the process of determining if a new dependency creates a cycle in the example set of dependencies illustrated in FIG. 5A in accordance with an embodiment of the present invention.

FIG. 5B illustrates the process of determining if new dependency 509 creates a cycle in the example set of dependencies illustrated in FIG. 5A in accordance with an embodiment of the present invention.

During a first iteration, the resource A 502 is added to the to_visit resource list.

During a second iteration, the system determines that resource A 502 depends on resource B 503 through new dependency 509. Hence, resource B 503 is added to the to_visit resource list, and resource A 502 is removed from the to_visit resource list and marked as visited.

During a third iteration, resource B 403 is removed from the to_visit resource list and marked as visited. There are no dependencies from resource B 403. Hence, the cycle detection process is complete, and no dependency cycles have been detected.

Data Structures

Figure 6:
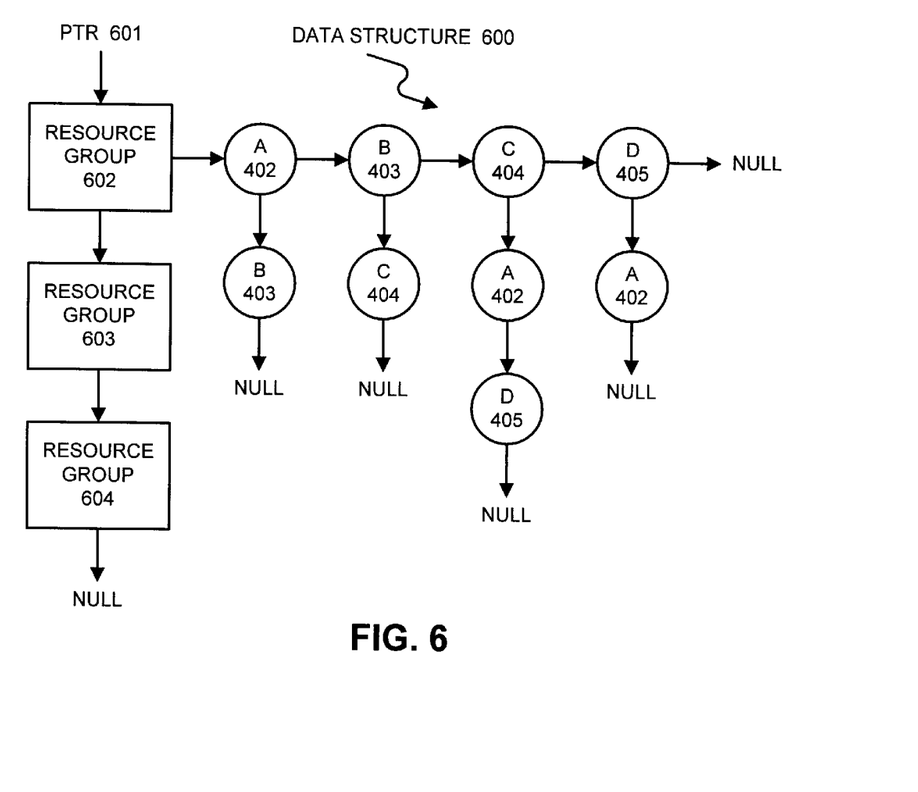
FIG. 6 illustrates a data structure involved in the cycle detection process in accordance with an embodiment of the present invention.

FIG. 6 illustrates a data structure 600 involved in the cycle detection process in accordance with an embodiment of the present invention. Data structure 600 keeps track of dependencies between resources within resource groups.

Data structure 600 is referenced through pointer 601, which points to a null-terminated linked list of resource group nodes 602–604. Each resource group node points to a null-terminated linked list of resource nodes. In particular, FIG. 6 illustrates the linked list of resources for resource group 602, which includes resources A 402, B 403, C 404 and D 405 from FIG. 4A.

Each resource points to a null-terminated linked list of other resources upon which the resource depends. For example, resource A 402 depends on resource B 403 through new dependency 409 in FIG. 4A. Resource B 403 depends upon resource C 404 through dependency 410. Resource C 404 depends upon resource A 402 through dependency 411, and upon resource D 405 through dependency 413. Finally, resource D 405 depends upon resource A 402 through dependency 412.

Note that the other resource groups 602–603 also have associated linked lists of resources (which are not shown). Also note that, in general any data structure that can keep track of dependencies between resources can be used in place of the data structure illustrated in FIG. 6. Furthermore, it is possible to construct a similar data structure to keep track of dependencies between resource groups.

Discussion

Note that the above-described embodiment of the present invention takes a "pro-active" approach to detecting cycles in a dynamic environment in which dependencies among resources are being constantly updated. This embodiment makes certain that there are no cycles in the resource dependency graph at all times. Hence, the dependency detection process must be repeated whenever the dependencies of a given resource are modified.

Therefore, given a graph G=(V, E) (where V is the set of vertices and E is the set of edges or dependencies) on which the cycle detection algorithm is to be run, then the graph G'=(V, E-E'), where E' is the set of new dependencies being added, does not contain any cycles because the cycles would have been detected previously when the cycle detection algorithm was run on the previous graph, G'.

Since the system only allows the dependencies of one resource to be modified at a time, and the entire process of detecting cycles is executed under a lock, the system ensures that the only differences between the graph G of the last run of algorithm and the graph G' of the current run of the algorithm are the new edges E' which all start at the given node N.

Hence, if any cycles result from the addition of E' (the new set of edges which all start at a given node N), then these cycles include node N. It is this corollary that enables us to optimize the traditional full-blown algorithm and limit our search to only the cycles including the node N, whose dependencies are being updated.

Figure 7:
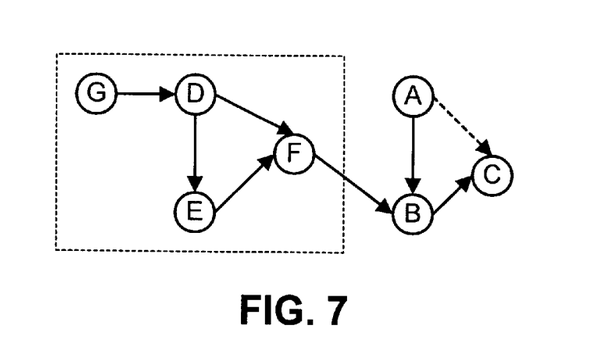
FIG. 7 illustrates an example dependency graph in accordance with an embodiment of the present invention.
Figure 8:
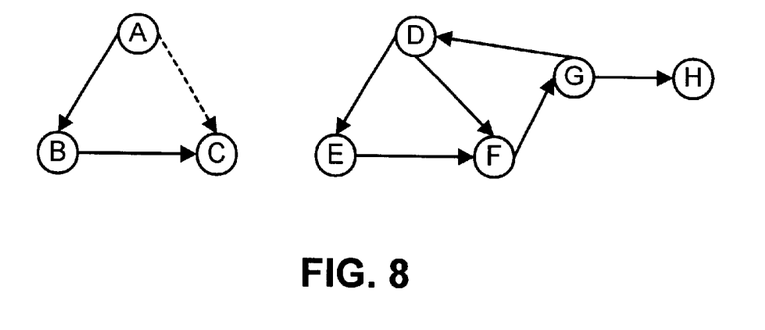
FIG. 8 illustrates another example dependency graph in accordance with an embodiment of the present invention.

For example, in FIG. 7 the dependencies of node A are being modified. Hence, the cycles detection process does not have to consider the sub-graph contained within the dotted lines. This property becomes even more obvious in case of a "disconnected graph." For example, in FIG. 8, since the dependencies of node A are being modified, the disconnected right-hand side of the graph (with nodes D, E, F, G, and H) does not have to be considered.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for detecting cycles in a set of dependencies between a set of resources in a computer system, comprising:

receiving a new dependency to add to the set of dependencies, wherein the set of dependencies includes no cycles prior to adding the new dependency, the new dependency indicating that a first resource from the set of resources cannot proceed unless a second resource from the set of resources is able to proceed;

determining if the new dependency creates a cycle in the set of dependencies by performing a search through a dependency graph that represents dependencies between resources that only looks for cycles of dependencies starting from the first resource and ending at the first resource, wherein a dependency indicates that one resource needs to interact with another resource in order to complete its task, and wherein the search examines only portions of the set of dependencies affected by the new dependency; and if the search detects such a cycle, indicating that the new dependency creates the cycle by:
sending an error message, and
aborting further processing, wherein aborting further processing makes certain that there are no cycles in the set of dependencies.

2. The method of claim 1, wherein performing the search involves:
initializing a to_visit resource list to include the first resource;
for all nodes in the to_visit resource list,
setting a current resource to be the head of the to_visit resource list,
marking the current resource as visited,
removing the current resource from the to_visit resource list, and
for each resource that the current resource depends on,
if the resource is the first resource, indicating that a cycle is_created, and
if the resource is not already in the to_visit resource list or has not been marked as visited, adding the resource to the to_visit resource list.

3. The method of claim 1, wherein the computer system includes a distributed computing system, and wherein resources in the set of resources are distributed across computing nodes in the distributed computing system.

4. The method of claim 1, wherein the set of resources includes applications, devices and processes within the computer system.

5. The method of claim 1, wherein the method is performed by a resource manager that starts and stops resources in the computer system.

6. The method of claim 1, wherein the set of resources is divided into a plurality of resource groups, each resource group including a plurality of related resources.

7. The method of claim 6, wherein performing the search includes looking for cycles of dependencies between resources within each resource group and looking for cycles of dependencies between resource groups.

8. A computer-readable storage medium storing instructions that when executed by a computer cause the computer to perform a method for detecting cycles in a set of dependencies between a set of resources in a computer system, the method comprising:
receiving a new dependency to add to the set of dependencies, wherein the set of dependencies includes no cycles prior to adding the new dependency, the new dependency indicating that a first resource from the set of resources cannot proceed unless a second resource from the set of resources is able to proceed;
determining if the new dependency creates a cycle in the set of dependencies by performing a search through a dependency graph that represents dependencies between resources that only looks for cycles of dependencies starting from the first resource and ending at the first resource, wherein a dependency indicates that one resource needs to interact with another resource in order to complete its task, and wherein the search examines only portions of the set of dependencies affected by the new dependency; and
if the search detects such a cycle, indicating that the new dependency creates the cycle by:
sending an error message, and
aborting further processing, wherein aborting further processing makes certain that there are no cycles in the set of dependencies.

9. The computer-readable storage medium of claim 8, wherein performing the search involves:
initializing a to_visit resource list to include the first resource;
for all nodes in the to_visit resource list,
setting a current resource to be the head of the to_visit resource list,
marking the current resource as visited,
removing the current resource from the to_visit resource list, and
for each resource that the current resource depends on,
if the resource is the first resource, indicating that a cycle is created, and
if the resource is not already in the to_visit resource list or has not been marked as visited, adding the resource to the to_visit resource list.

10. The computer-readable storage medium of claim 8, wherein the computer system includes a distributed computing system, and wherein resources in the set of resources are distributed across computing nodes in the distributed computing system.

11. The computer-readable storage medium of claim 8, wherein the set of resources includes applications, devices and processes with the computer system.

12. The computer-readable storage medium of claim 8, wherein the method is performed by a resource manager that starts and stops resources in the computer system.

13. The computer-readable storage medium of claim 8, wherein the set of resources is divided into a plurality of resource groups, each resource group including a plurality of related resources.

14. The computer-readable storage medium of claim 13, wherein performing the search includes looking for cycles of dependencies between resources within each resource group and looking for cycles of dependencies between resource groups.

15. An apparatus that detects cycles in a set of dependencies between a set of resources in a computer system, comprising:
a receiving mechanism that receives a new dependency to add to the set of dependencies, wherein the set of dependencies includes no cycles prior to adding the new dependency, the new dependency indicating that a first resource from the set of resources cannot proceed unless a second resource from the set of resources is able to proceed; and
a cycle detection mechanism that determines if the new dependency creates a cycle in the set of dependencies by performing a search through a dependency graph that represents dependencies between resources that only looks for cycles of dependencies starting from the first resource and ending at the first resource, wherein a dependency indicates that one resource needs to interact with another resource in order to complete its task, and wherein the search examines only portions of the set of dependencies affected by the new dependency;
wherein the cycle detection mechanism is configured to indicate that the new dependency creates the cycle if the search detects the cycle by:
sending an error message, and
aborting further processing, wherein aborting further processing makes certain that there are no cycles in the set of dependencies.

16. The apparatus of claim 15, wherein while performing the search, the cycle detection mechanism is configured to:
  initialize a to_visit resource list to include the first resource;
  for all nodes in the to_visit resource list, to
    set a current resource to be the head of the to_visit resource list,
    mark the current resource as visited,
    remove the current resource from the to_visit resource list, and
    for each resource that the current resource depends on, to
      indicate that a cycle is created if the resource is the first resource, and to
      add the resource to the to_visit resource list if the resource is not already in the to_visit resource list or has not been marked as visited.

17. The apparatus of claim 15, wherein the computer system includes a distributed computing system, and wherein resources in the set of resources are distributed across computing nodes in the distributed computing system.

18. The apparatus of claim 15, wherein the set of resources includes applications, devices and processes within the computer system.

19. The apparatus of claim 15, wherein the cycle detection mechanism is part of a resource manager that starts and stops resources in the computer system.

20. The apparatus of claim 15, wherein the set of resources is divided into a plurality of resource groups, each resource group including a plurality of related resources.

21. The apparatus of claim 20, wherein the cycle detection mechanism is configured to look for cycles of dependencies between resources within each resource group, and to look for cycles of dependencies between resource groups.

* * * * *